US010536379B2

(12) United States Patent
Atli et al.

(10) Patent No.: US 10,536,379 B2
(45) Date of Patent: Jan. 14, 2020

(54) SYSTEM AND METHOD FOR CONTROL TRAFFIC REDUCTION BETWEEN SDN CONTROLLER AND SWITCH (71) Applicant: ARGELA YAZILIM VE BILISIM TEKNOLOJILERI SAN. VE TIC. A.S., Istanbul (TR)

(72) Inventors: Ali Volkan Atli, Istanbul (TR); Serkant Uluderya, Istanbul (TR); Sinan Tatlicioglu, Istanbul (TR); Seyhan Civanlar, Istanbul (TR)

(73) Assignee: Argela Yazilim ve Bilisim Teknolojileri San ve Tic. A.S., Istanbul (TR)

(*) Notice: Subject to any disclaimer, the term of this patent is extended or adjusted under 35 U.S.C. 154(b) by 0 days.

(21) Appl. No.: 15/718,701

(22) Filed: Sep. 28, 2017

(65) Prior Publication Data
US 2019/0097931 A1    Mar. 28, 2019

(51) Int. Cl.
*H04L 29/12*    (2006.01)
*H04L 12/801*   (2013.01)
*H04L 12/861*   (2013.01)
*H04L 12/931*   (2013.01)
*H04L 12/715*   (2013.01)
*H04L 12/835*   (2013.01)
*H04L 12/823*   (2013.01)

(52) U.S. Cl.
CPC ............ *H04L 47/12* (2013.01); *H04L 45/64* (2013.01); *H04L 47/30* (2013.01); *H04L 47/32* (2013.01); *H04L 49/70* (2013.01); *H04L 49/90* (2013.01)

(58) Field of Classification Search
None
See application file for complete search history.

(56) References Cited

U.S. PATENT DOCUMENTS

| 9,013,995 | B2* | 4/2015 | Beheshti-Zavareh ........ H04L 47/22 370/235 |
| 9,264,362 | B2* | 2/2016 | Hwang ................. H04L 47/12 |
| 9,893,951 | B1* | 2/2018 | Medved ................ H04L 41/12 |
| 2002/0071398 | A1* | 6/2002 | Moran ................. H04L 47/10 370/252 |
| 2005/0152369 | A1* | 7/2005 | Ambe ................... H04L 12/44 370/392 |
| 2007/0223372 | A1* | 9/2007 | Haalen ................. H04L 45/38 370/229 |

(Continued)

OTHER PUBLICATIONS

X. Steven Sun, et. al., Controlling Race Conditions in OpenFlow to Accelerate Application Verification and Packet Forwarding published in IEEE Transactions on Network and Service Management, vol. 12, No. 2, Jun. 2015, pp. 263-277.

(Continued)

*Primary Examiner* — Bunjob Jaroenchonwanit
(74) *Attorney, Agent, or Firm* — IP Authority, LLC; Ramraj Soundararajan (57) ABSTRACT A novel technique is shown for throttling control traffic in a Software Defined Network (SDN) between a controller and network switches when the controller and/or one or more control channels are congested. In this technique, the controller's processing power and the limited control channel bandwidth are more efficiently managed by drastically cutting down the control traffic during times of congestion.

10 Claims, 7 Drawing Sheets

(56) References Cited

U.S. PATENT DOCUMENTS

| | | | | |
|---|---|---|---|---|
| 2010/0061241 A1* | 3/2010 | Sindhu | H04L 47/10 | 370/235 |
| 2012/0020219 A1* | 1/2012 | Kamiya | H04L 45/125 | 370/235 |
| 2013/0128746 A1* | 5/2013 | Yedavalli | H04L 45/38 | 370/238 |
| 2013/0258847 A1* | 10/2013 | Zhang | H04L 47/22 | 370/232 |
| 2013/0294236 A1* | 11/2013 | Beheshti-Zavareh | H04L 47/22 | 370/235 |
| 2014/0003232 A1* | 1/2014 | Guichard | H04L 67/16 | 370/230 |
| 2014/0198638 A1* | 7/2014 | Campbell | H04L 47/12 | 370/230 |
| 2014/0241353 A1* | 8/2014 | Zhang | H04L 45/74 | 370/390 |
| 2014/0269288 A1* | 9/2014 | Crisan | H04L 47/2425 | 370/231 |
| 2014/0269295 A1* | 9/2014 | Anumala | H04L 41/08 | 370/235 |
| 2015/0039734 A1* | 2/2015 | King | H04L 41/0816 | 709/221 |
| 2015/0117451 A1* | 4/2015 | Kaneriya | H04L 45/745 | 370/392 |
| 2016/0065385 A1* | 3/2016 | Hwang | H04L 47/12 | 370/392 |
| 2016/0080481 A1* | 3/2016 | Bisht | H04L 67/1002 | 370/235 |
| 2016/0142285 A1* | 5/2016 | Lee | H04L 63/22 | 370/392 |
| 2016/0241459 A1* | 8/2016 | Zheng | H04L 45/38 | |
| 2016/0294682 A1* | 10/2016 | Bi | H04W 76/10 | |
| 2016/0301603 A1* | 10/2016 | Park | H04L 45/586 | |
| 2016/0323144 A1* | 11/2016 | Luo | H04L 41/0816 | |
| 2016/0330113 A1* | 11/2016 | Chiba | H04L 45/38 | |
| 2017/0093734 A1* | 3/2017 | Sasaki | H04L 45/42 | |
| 2017/0142000 A1* | 5/2017 | Cai | H04L 29/06 | |
| 2017/0201435 A1* | 7/2017 | Tan | H04L 41/085 | |
| 2017/0257319 A1* | 9/2017 | Roch | H04L 47/38 | |
| 2017/0289026 A1* | 10/2017 | Hu | H04L 49/70 | |
| 2018/0262418 A1* | 9/2018 | Yang | H04L 63/1425 | |

OTHER PUBLICATIONS

S. Shin, et. al., "AVANT-GUARD: Scalable and Vigilant Switch Flow Management in Software-Defined Networks," in Proc. the 20th ACM Conference on Computer and Communications Security (CCS), 2013, 12pgs.

H. Wang, et. al., "FloodGuard: A DoS Attack Prevention Extension in Software-Defined Networks," in Proc. IEEE/IFIP Int'l Conf. Dependable Systems and Networks, 2015, 12pgs.

* cited by examiner

SYSTEM AND METHOD FOR CONTROL TRAFFIC REDUCTION BETWEEN SDN CONTROLLER AND SWITCH

BACKGROUND OF THE INVENTION

Field of Invention

The present invention relates to a system and a method designed for throttling control traffic in a Software Defined Network (SDN) between a controller and network switches when the controller and/or one or more control channels are congested. With this invention, the controller's processing power and the limited control channel bandwidth are more efficiently managed by drastically cutting down the control traffic during times of congestion.

Discussion of Related Art

Any discussion of the prior art throughout the specification should in no way be considered as an admission that such prior art is widely known or forms part of common general knowledge in the field.

Software defined network (SDN) is a recent networking paradigm and a strong candidate to become the architecture of the future Internet. Fundamentally, the key concepts of SDN offer the basis for the system and method of this invention. A typical SDN is decoupled into two planes: a data plane comprised of 'switches', which perform data forwarding, and a control plane connecting all switches to a 'controller', which calculates routing (or flow) tables and sends them to the switches. Doing so, the packet forwarding and route calculation tasks are decoupled. The switches perform fast packet forwarding while the controller performs fast calculation of routes. Switches are mainly special-purpose hardware devices designed for packet switching, while the controller is software based and logically centralized. Furthermore, SDN provides an abstraction for network operators/programmers and allows network policies to be defined in high-level languages. The SDN controller transforms these complex policies into low-level forwarding rules and switches forward data packets according to these rules.

When a packet arrives at the ingress switch (the first switch along a packet's route entering an SDN), that switch looks up its forwarding table (known also as 'table lookup') to find a rule matching the header of the received packet to determine how to process and route the packet in that SDN. If there is a matching rule, the actions listed in that rule are performed by the switch. If no matching rule is found, a condition known as a 'table-miss', the ingress switch asks the controller for any actions to be performed on the packet by sending the incoming packet wrapped in an OpenFlow packet-IN message. In essence, any packet for which there is no forwarding rule is sent to the controller, which acts as a centralized default router. In response, the controller (i) processes the incoming packet-IN message, (ii) calculates how to route the data packet contained in the message, (iii) determines the corresponding instruction(s) not only as it applies to the ingress switch but for all switches along the packet's calculated route towards its destination, (iv) sends an OpenFlow flow-mod message containing the instruction(s) on how to route and treat that packet to all these switches which have to add these instruction(s) to their forwarding tables. Along with the flow-mod message, the controller sends back the original packet to the ingress switch in an OpenFlow packet-OUT message so that the switch can now correctly route the packet towards its destination. This process is clearly defined in OpenFlow Switch Specification 1.5.1 published by Open Networking Foundation.

A flow is comprised of packets that are similarly or identically treated by the switches. Therefore, when there is a rule (or instruction) installed in a switch's forwarding table, the packets of the corresponding flow are all processed according to that rule. Prior to installation of the rule, i.e., when there is a table-miss, however, all packets of the flow are one-by-one sent to the controller by the ingress switch using the control channel, each packet in a separate packet-IN message, until the controller responds to at least one of these messages with a flow-mod message. Often this process clogs the control channel.

In an ideal situation, the controller responds instantly to the first packet-IN message so that rest of the packets are not sent to the controller, but instead immediately forwarded along the determined packet route towards the destination. However, in a real world scenario, the controller may need considerable amount of time to respond because it is busy handling many other tasks in parallel, resulting in the ingress switch sending a significant number of packet-IN messages to the controller, while it is awaiting an instruction. This behavior of OpenFlow switches results in a highly inefficient use of the control channel and the controller. Furthermore, the controller processes each one of the incoming packet-IN messages, even though it already gave a response to a previous packet-IN message that belongs to the same flow. Thus, precious control channel capacity between the switch and the controller is used up by all those packets of a flow, essentially causing the use of the control channel as a pseudo data channel for all these 'unknown' packets, while the controller is busy trying to determine the rule that will handle the first packet of the flow.

A further issue with the packet-IN/flow-mod/packet-Out sequence explained above is various race conditions that arise between the flow-mod messages and the data packets arriving at the intermediate switches along the packet's route. Several categories of race conditions are detailed in (Ref 1: X. Steven Sun, et. al., "Controlling Race Conditions in OpenFlow to Accelerate Application Verification and Packet Forwarding" published in IEEE Transactions on Network and Service Management, Volume 12, No. 2, June 2015). These race conditions arise particularly when the controller is busy or the control channel's capacity is much smaller than the data network's transmission capacity causing control traffic to arrive at the intermediate switches along the packet's route in a much slower rate than the data traffic. In an exemplary race scenario, an ingress switch, S1 along the route of packet p1 receives the flow-mod/packet-OUT message corresponding to p1, and immediately forwards the packet according to the rule specified by the controller to the second switch, S2 along the packet's route, but S2 has not received the flow-mod corresponding to p1 from the controller or possibly received it but has not processed yet, in which case S2 has a table-miss for p1 as well and will forward p1 to the controller in a packet-IN, and starts waiting for an instruction from the controller. In this scenario, S2 will receive a first flow-mod for p1, corresponding to the packet-IN sent to the controller by S1 (unfortunately after p1 arrives at S2), as well as a second flow-mod for p1, corresponding to the packet-IN sent to the controller by S2. Both messages contain identical instructions. This is just one simple race condition arising due to a timing issue. Such race conditions between the control traffic and data traffic can cause numerous superfluous messages floating around on the control channels clogging the channels and making the controller work even harder.

Yet another issue is the network security. The control channel and the controller resources are critical for the proper functioning of the SDN network and must be used sparingly. The vulnerability of the control plane to packet-IN message floods can be easily exploited by malicious attackers with specially crafted packets in the form of Denial of Service (DoS) or distributed DoS attacks simply to deplete the controller processing resources and to completely clog the control channel. Several prior art propose solutions to prevent such attacks including deploying rate control on packet-IN messages. Meaning, the switch may have the logic to throttle the packet-IN traffic exceeding a preset threshold simply by dropping those packets and not sending them to the controller. This mechanism protects the controller from receiving high-volume packet-IN traffic at the cost of dropping legitimate traffic.

OpenFlow protocol designers oversaw the risk and added a simple packet buffering capability to OpenFlow switches. With this capability, a switch has the option of not sending the entire packet's content to the controller, but only the header portion aiding the controller to make a routing decision. Note that the payload of the packet is irrelevant for route determination. However, even when using this capability, the OpenFlow switch still sends packet-IN messages with headers of every packet belonging to the same unknown flow, until the controller installs the corresponding instructions in the switch. Until a flow-mod/packet-OUT has arrived, the switch buffers the payloads of those packet headers sent in packet-IN messages.

Although switches may have the buffering capability, it is not desirable to rely on switch buffers as part of the usual forwarding operations because (i) the buffering capability is usually limited, and (ii) buffer handling (storing and releasing) by the switch during forwarding requires processing, and therefore, is time consuming. At every cost, the switch must rapidly proceed with sending packets received to the next hop switch, and if the next hop switch is not specified because of a table-miss, towards the controller as the next hop until an OpenFlow message specifies the next hop switch.

Buffering packets of an entire flow within the switch and sending only the first packet to the controller is suggested in prior art by Steven Sun et. al. They further propose that in a race scenario as described above, S1 can send a special, so called Attendre Command (AC), data packet along with packet p1 to S2, which indicates to S2 that it should buffer p1 and the rest of the packets of that flow, and wait for the flow-mod message that it will receive because S1 has already received its flow-mod for p1. This technique causes the packets to be buffered at those intermediate switches along the route as well until the flow-mod message corresponding to the flow arrives at each switch. This proposal relies on switches generating the AC packet after a table-miss, and sending AC along with the first packet for every flow. This proposal also requires heavy lifting by the switches generating and processing those AC packets while performing forwarding.

In summary, having a centralized controller creates an opportunity to monitor and program the entire network, but as a side effect, it causes the control plane to become a single point of failure. Denial of Service attacks or even heavy control traffic conditions can easily become real threats to the proper functioning of a controller, which indirectly detriments the entire network. Packet buffering, which is inevitable, is a way to reduce superfluous packet-IN and flow-mod/packet-OUT floods, but at the cost of slowing down switches since buffer handling requires significant processing, and hence, detriments the forwarding performance.

In this invention, we describe a new controller system, a simple protocol extension to OpenFlow and a simple method to reduce the control traffic. We utilize two complementary mechanisms:

a) A new indication of control plane congestion by a control_congested (and control_uncongested) message, which is sent by the controller to one or more network switches indicating that either the controller or the control channel towards that switch is congested, and therefore it is slow in processing packets. When the controller sends a control_congested to a switch, the switch starts sending only the first packet of a flow to the controller when there is a table-miss and buffers the rest of the packets of the unknown flow in their entirety in the switch memory until the controller responds with a flow-mod or until a time-out occurs. When a control_uncongested is received after a control_congested, meaning that the controller is no longer in a congested mode, the receiving switch resumes normal OpenFlow operations for a table-miss, meaning that it stops buffering unknown packets. The buffer_id feature of OpenFlow, which has been designed to identify individually buffered packets within a switch to associate a header to a packet payload, can be reused to identify flows buffered as a series of packets during a table-miss when the controller is in a congested state. Note that the switch may also detect that its control channel is congested simply by counting packets, but it may not be able to detect that controller's processor is overloaded. Thus, an explicit indicator by the controller is needed. Using the explicit indicator, the switch is forced to get into a buffering mode sparingly, i.e., only when there is an explicit congestion indication.

b) Using the Barrier Request/Reply messages already defined in OpenFlow standards in a coordinated manner to prevent out of sequence messages. Here is how it works: the controller sends a Barrier Request message right after the flow-mod message to the switches along the packet's route except the ingress switch. The switches that get the Barrier Request must complete the processing of all messages sent to it by the controller prior that Barrier Request and before processing any messages sent after the Barrier Request. When the switch completes the processing accordingly, it sends back a Barrier Reply to the controller along with the ID of the Barrier Request so that the controller can associate the reply with the request. In effect, the Barrier Reply is used as an indication that flow-mod message is received and processed, and hence the flow table is updated accordingly. Doing so, the controller ensures that all switches along the packet's route update their flow tables according to the flow-mod message sent before the Barrier Request, and only then it will send the flow-mod to the ingress switch. Accordingly, the ingress switch will not release any buffered packets towards the next switch along the packet's route until all switches update their flow tables. However, waiting for the Barrier Reply messages at the controller may somewhat increase the packet delay. This mechanism achieved slightly delaying the flow-mod message towards the ingress switch until all flow-mod messages are received and processed by the rest of the switches along the route of the packet. Doing so, the controller guarantees that all intermediate switches along the route of the packet flow know how to properly forward the packets without them needing to buffer packets, and without causing race conditions between data packets and flow-mode packets.

The method of this invention has the following key advantages:

(1) Only the ingress switch buffers the unknown flow's packets, while the intermediate switches do not receive these packets from the ingress switch and therefore do not need to buffer them, minimizing the processing burden on the intermediate switches;

(2) The intermediate switches do not send the superfluous packet-IN messages to the controller, greatly relieving controller's processing load and control channel occupancy;

(3) The buffering at the ingress switch is only triggered when a control network congestion occurs. Otherwise, buffering is not used.

In summary, because the use of switch buffers according to the method of b) above slows down the ingress switch, we essentially devised a two-stage method with first the method of a) above by which the controller signals the switch that it is congested (telling it to start buffering), and then the implementation of method of b) above to prevent out-of-sequence flow-mods.

When the control plane and/or the controller are uncongested, the normal operation of OpenFlow as defined by the standards is used, meaning all packets of a flow when there is a table-miss are forwarded towards the controller, and therefore no packet is being buffered within the switches. Under normal operations, the flow-mod messages are usually received in a timely manner, not causing any race conditions with data packets or any packet-IN/flow-mod/packet-OUT floods.

In a congested mode, the ingress switch may either buffer the remaining series of packets of the unknown flow until the flow-mod message is received, or simply drop them. Dropping is typically resorted when the switch runs out of idle buffer space. Dropping mode can be initiated by the switch alone or by the controller when noticing a packet-IN flood (using an indicator in the control_congested message).

Embodiments of the present invention are an improvement over prior art systems and methods.

SUMMARY OF THE INVENTION

In one embodiment, the present invention provides a mechanism to more efficiently use the control plane. What is described is a method in a Software Defined Network (SDN) comprised of at least one controller and many switches, wherein a packet flow enters that SDN at an ingress switch and there is at least one other switch attached to the ingress switch, the ingress switch having no flow table entry concerning said packet flow, called unknown flow, at the time of receiving the first packet of the flow, (a) said first packet of the unknown flow being sent by the ingress switch to said controller requesting instructions for processing the packets of the unknown flow, while all the other packets of the unknown flow are being buffered by the ingress switch, (b) said controller determining a route for the packet flow, the route traversing the other switch attached to the ingress switch as a next hop, (c) sends a message containing a flow table entry to the other switch for said packet flow, and another message subsequently to request the other switch to process all control messages it received thus far, (d) said other switch replies the controller when it completes said processing, (e) the ingress switch then receives the flow table entry from the controller indicating the next hop switch being the other switch, (f) said ingress switch sends the buffered packets towards said other switch, and (g) said other switch upon receiving the packets of the flow from said ingress switch routes packets towards the destination according to flow table entry it received from the controller. In one embodiment, this method is activated only when the control network is congested. In one embodiment, the control network occurs when the controller's processor is overloaded or when one or more control channels do not have any capacity. The controller sends the ingress switch a congestion indication using a new OpenFlow message. The switch replies to this message.

In another embodiment, the present invention provides a method as implemented in a Software Defined Network (SDN) comprising a controller and a plurality of switches, the method comprising: (a) receiving, at an ingress switch, an unknown packet flow entering the SDN, the ingress switch attached to at least one other switch, both the ingress switch and the one other switch having no flow table entry related to the unknown packet flow at the time of receiving a first packet of the packet flow, (b) the ingress switch sending the first packet of the unknown packet flow to the controller to request instructions for processing the unknown packet flow and buffering remainder packets of the unknown packet flow at the ingress switch; (c) the controller determining a route for the unknown packet flow, the determined route traversing the one other switch attached to the ingress switch as a next hop; (d) the controller sends a first message containing a flow table entry to the one other switch for the unknown packet flow, and a second message to request the one other switch to process all received control messages; (e) the one other switch replying to the controller when it completes said processing all received control messages; (f) the ingress switch receiving the flow table entry from the controller indicating the next hop switch being the one other switch; (g) the ingress switch sending the remainder packets that were buffered towards the one other switch; (h) the one other switch, upon receiving the packets sent in (g), routing them towards a destination according to the received flow table entry.

In another embodiment, the present invention provides a system implemented in a Software Defined Network (SDN) comprising a controller and a plurality of switches, the system comprising: (a) a controller; (b) an ingress switch; and (c) one other switch, the ingress switch attached to at least one other switch; wherein the ingress switch receiving an unknown packet flow entering the SDN, both the ingress switch and the one other switch having no flow table entry related to the unknown packet flow at the time of receiving a first packet of the packet flow, the ingress switch sending the first packet of the unknown packet flow to the controller to request instructions for processing the unknown packet flow and buffering remainder packets of the unknown packet flow at the ingress switch, the controller determining a route for the unknown packet flow, the determined route traversing the one other switch attached to the ingress switch as a next hop; wherein the controller sends a first message containing a flow table entry to the one other switch for the unknown packet flow, and a second message to request the one other switch to process all received control messages; the one other switch replying to the controller when it completes said processing all received control messages; and wherein the ingress switch receiving the flow table entry from the controller indicating the next hop switch being the one other switch; the ingress switch sending the remainder packets that were buffered towards the one other switch; and the one other switch, upon receiving the sent packets, routing them towards a destination according to the received flow table entry.

In an extended embodiment, the system further comprises: (a) a control network monitor subsystem with controller processor and control channels monitoring capabilities, determining if a control network is congested or not; (b) a first database containing controller processor and control channel key performance indicators collected periodically or on an event-driven basis; (c) a control network congestion manager subsystem managing control traffic load on control channels by signaling the ingress switch of unknown flows to start packet buffering when there is congestion; and (d) a second database containing congestion states of the control channels and controller processors.

In yet another embodiment, the present invention provides an article of manufacture comprising non-transitory computer storage medium storing computer readable program code which, when executed by a computer, implements a method as implemented in a Software Defined Network (SDN) comprising a controller and a plurality of switches, the medium comprising: (a) computer readable program code receiving, at an ingress switch, an unknown packet flow entering the SDN, the ingress switch attached to at least one other switch, both the ingress switch and the one other switch having no flow table entry related to the unknown packet flow at the time of receiving a first packet of the packet flow, (b) computer readable program code sending, at the ingress switch, the first packet of the unknown packet flow to the controller to request instructions for processing the unknown packet flow and buffering remainder packets of the unknown packet flow at the ingress switch; (c) computer readable program code at the controller determining a route for the unknown packet flow, the determined route traversing the one other switch attached to the ingress switch as a next hop; (d) computer readable program code at the controller sending a first message containing a flow table entry to the one other switch for the unknown packet flow, and a second message to request the one other switch to process all received control messages; (e) computer readable program code at the one other switch replying to the controller when it completes said processing all received control messages; (f) computer readable program code at the ingress switch receiving the flow table entry from the controller indicating the next hop switch being the one other switch; (g) computer readable program code at the ingress switch sending the remainder packets that were buffered towards the one other switch; (h) computer readable program code at the one other switch, upon receiving the packets sent in (g), routing them towards a destination according to the received flow table entry.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a switch, a controller) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a controller or a switch is a networking component, including hardware and software that communicatively interconnects with other equipment of the network (e.g., other network devices, and end systems). Switches provide the function of data transmission over wireline or wireless links for telephones, computers, sensors, etc., and provide the core network connectivity to other networking equipment such as other switches, gateways, and routers. They may exhibit multiple layer networking functions (e.g., routing, bridging, VLAN (virtual LAN) switching, layer-2 switching, Quality of Service, and/or subscriber management), and/or provide support for traffic coming from multiple application services (e.g., data, voice, and video). Each switch is identified by a layer-3 address such as an IP address. The controller connects to one or more switches via control channels, sending and receiving control messages according to OpenFlow protocol. The controller is identified by a layer-3 address such as an IP address. There may be one or more controllers in master-slave or peer-to-peer mode controlling an SDN.

Note while the illustrated examples in the specification discuss mainly an SDN with a separate controller(s) to manage network resources in communications with a group of switches, embodiments of the invention may also be implemented in other types of programmable networks using protocols other than OpenFlow. It can be implemented in any layered network architecture wherein there is a control infrastructure separated from data transmission that can be instructed to route flows differently and change the allocation of network resources. Unless specified otherwise, the embodiments of the invention apply to any programmable switch and software based controller.

Figure 1:
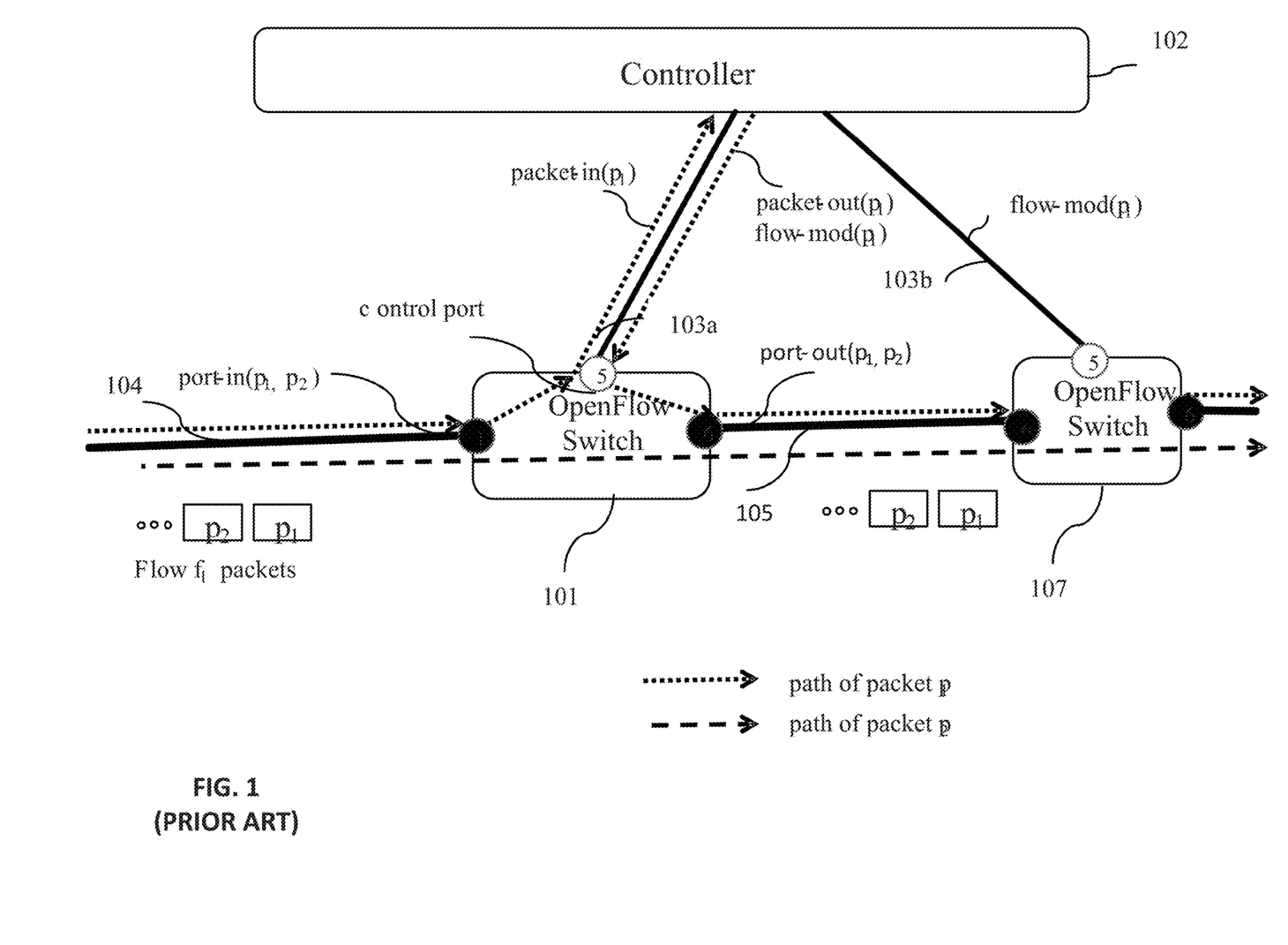
FIG. 1 is an exemplary prior art network showing packet-IN messages.

FIG. 1 shows a prior-art scenario where two data packets, p1 and p2, belonging to the same flow f1 successively enter into ingress switch 101 (through a port-in) and switch 101 first sends a packet-IN message to controller 102 for p1 because there is a table-miss (i.e., an unknown flow). Switch 101 is attached to controller 102 with control channel 103a. Also illustrated in the figure is another switch 107, which is attached to switch 101 and connected to controller 102 with control channel 103b. Controller 102 instantly responds to the packet-IN message belonging to p1 with flow-mod message and sends back p1 in a packet-OUT to switch 101. In that case, switch 101 doesn't need to send a packet-IN message for p2 since it already acquired the knowledge of which port to forward the packet through the instruction received in the flow-mod corresponding to p1. The data connections of switch 101 are though links 104 and 105. The packets of the flow are received on 104 and forwarded onto 105 towards switch 107 (the intermediate and destination switch). In summary, the sequence of operations is as follows:

1) p1, a data packet belonging to the flow f1, enters ingress switch 101.

2) Ingress switch 101 checks to determine if there is a rule for this flow in the flow tables, and finds out that no rule is associated with f1 (a table-miss), or the general rule action for this flow is to send its packets to controller 102 on control channel 103a.

3) Ingress switch 101 wraps p1 inside the packet-IN header and sends it to controller 102. More specifically, using the current implementation of OpenFlow 1.5.1:

If 'max_len' field is set to OFPCML_NO_BUFFER, meaning no buffer_id is assigned in the packet-IN message header, the whole packet is sent to the controller, and p1 is deleted from the switch's memory.

If 'max_len' field is not set to OFPCML_NO_BUFFER but set to an integer value, meaning that a unique buffer_id is assigned in the packet-IN message header, then only the portion defined by 'max_len' field is sent to the controller while the rest of p1 is buffered within the switch memory.

4) Controller 102 processes the packet-IN message, makes a routing decision that the next hop for p1 is switch 107, and updates both switches 101 and 107 with flow-mod messages to install a new rule for f1. If no buffer_id is set inside the packet-IN header (meaning p1 is already deleted from switch 101's memory), the controller must also send a packet-OUT message containing p1 to switch 101. If a buffer_id is set inside the packet-IN header, however, the controller returns the same buffer_id inside the flow_mod message so that switch 101 can find the location of the packet inside its memory.

5) Switches 101 and 107 update their flow tables according to the content of the flow_mod.

6) If p1 is sent back inside a packet-OUT to switch 101, it is sent through the output port (per the action defined inside the flow_mod message) towards switch 107.

7) p2, another data packet belonging to the flow f1, enters switch 101.

8) Switch 101 checks to determine if there is a rule in its flow tables and indeed finds a rule associated with p2.

9) Switch 101 sends p2 through the same output data port towards switch 107 without needing to send it to the controller.

Figure 2:
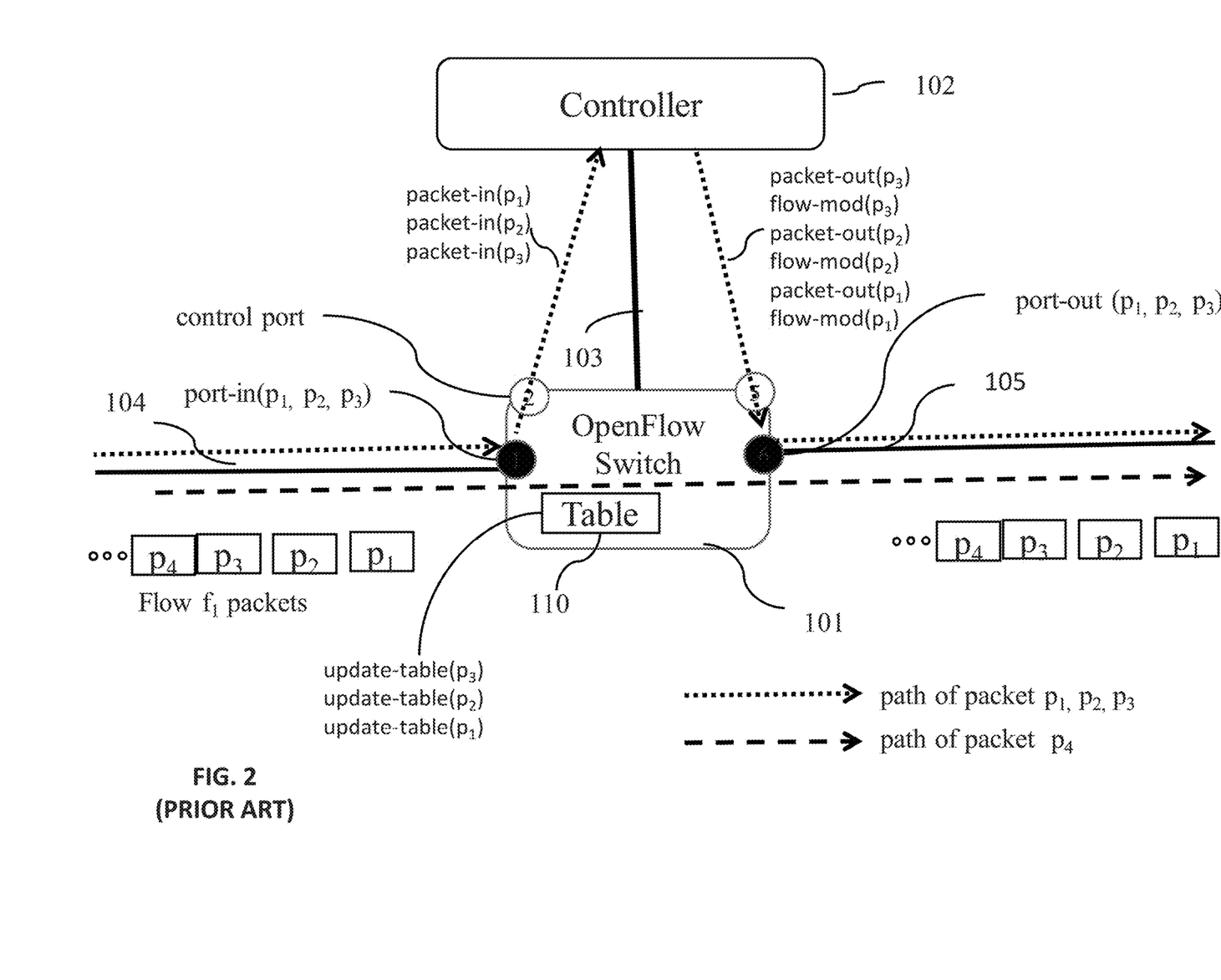
FIG. 2 is an exemplary prior art network showing a packet-IN flood.

FIG. 2 shows the real-world scenario where the step for the controller to respond to p1 in the above scenario takes a considerable time, and before a flow rule can be set for f1 in the flow tables, two new packets p2 and p3, both belonging to f1, enter ingress switch 101. Therefore, the switch seeing the table-miss sends a new packet-IN message for each of these packets. The controller processes each incoming packet-IN message separately, and returns a new flow_mod message (and a packet-OUT message if no buffer_id is set) with the same action in each flow_mod—yielding a completely redundant operation. Switch 101 processes each flow_mod message (and each packet-OUT message if there is any) and updates its flow tables with every incoming flow_mod (even through each update is exactly the same). Eventually when p4 arrives, the switch finds the associated rule in the flow table and sends p4 through the output port. Although it is not shown in FIG. 2, flow-mod(p1), flow-mod(p2) and flow-mod(p3) messages all arrive at switch 107 of FIG. 1 as well. Also note that these messages are superfluous, meaning they contain exactly the same instructions for the unknown flow. Flow table 110 is shown in FIG. 2 in which the instruction contained in the flow-mod message(s) is recorded.

All of these messages shown on control channel 103 of FIG. 2 are superfluous, consuming the switch and the controller processing resources while using up the control channel capacity. Not only that but these repeated superfluous messages also clog the control channel of other switches.

It is clear the efficiency can be increased considerably if only one packet-IN message for every flow is sent, regardless of how many packets are received, while buffering the rest of the packets at the ingress switch while awaiting the controller's instructions. Because only one packet-IN is sent per flow by the ingress switch, all other switches along the data path's route will be receiving only one flow-mod message.

Most of the prior art is focused on the security services that can be provided using new SDN capabilities and there is not much work done to protect the SDN controller from the packet-IN floods. Avant-Guard (Ref 2: S. Shin, et. al., "AVANT-GUARD: Scalable and Vigilant Switch Flow Management in Software-Defined Networks," in Proc. the 20th ACM Conference on Computer and Communications Security (CCS), 2013) being one of the pioneering works in this area, proposes a TCP Proxy module inside an OpenFlow switch in order to distinguish legitimate users from attackers. If a host does not finish the 3-way TCP handshake process, the switch doesn't send any packet-IN messages for the received packets. Avant-Guard also proposes the concept of "conditional rules" which are installed inside OpenFlow switches but activated only when certain conditions are met. The problem with Avant-Guard is that it only protects against TCP attacks and requires a great deal of intervention inside OpenFlow switches, which is not a practical.

FloodGuard (Ref 3: H. Wang, et. al., "FloodGuard: A DoS Attack Prevention Extension in Software-Defined Networks," in Proc. IEEE/IFIP Int'l. Conf. Dependable Systems and Networks, 2015) proposes the use of a data plane cache server outside the OpenFlow switches. When a packet-IN flood attack is detected the related switches are told to send their packet-IN messages to this cache server instead of the SDN controller. The use of extra data cache servers implies extra costs.

Floodlight, an open source SDN controller, supports monitoring the count of packet-IN messages. When a certain threshold is exceeded, the controller starts dropping packet-IN messages originating from the same host. In doing so, Floodlight may also be dropping legitimate traffic.

When multiple unknown flows have to be processed by the switch when control network congestion occurs, the buffering method used in this invention will be comprised of the following steps known in prior art:

1) If the rule action for a flow is to send the packet to the Controller and max_len field is not set to OFPCML_NO_BUFFER, then the switch logic should check the flow buffering area first:

a) If there is already an entry for that flow in the buffer, then the new packet is added in this buffering area, and no packet-IN message is sent to the controller.

b) If there is no entry for the flow in this area, then a new 'flow buffering list' is reserved and a portion of the packet is sent in a packet-IN message with a unique buffer_ID, which now points to the chosen buffered area.

2) When the controller returns a flow-mod message with the unique buffer_ID, the switch applies the rule action for every packet buffered in the 'flow buffering list'.

3) If the controller wishes to direct all data packets to itself, it sends a packet-OUT message without a flow_mod message in response to the first packet's packet-IN. In response, the next packet of that flow in the buffer is sent out to the controller in a packet-IN message with a different unique buffer_id (now pointing to the next packet in the buffer) towards the controller and the packet is removed from the buffering list.

4) If a time-out occurs for the first packet-IN message sent to the controller, then the next packet in the buffer is sent to the controller in a packet-IN message with the previous buffer_id.

Although buffering can be implemented in hardware-based OpenFlow switches, a softswitch such as Open vSwitch (OvS) well known in prior art, which is an OpenFlow-compliant virtual switch, is also a viable platform.

Figure 3:
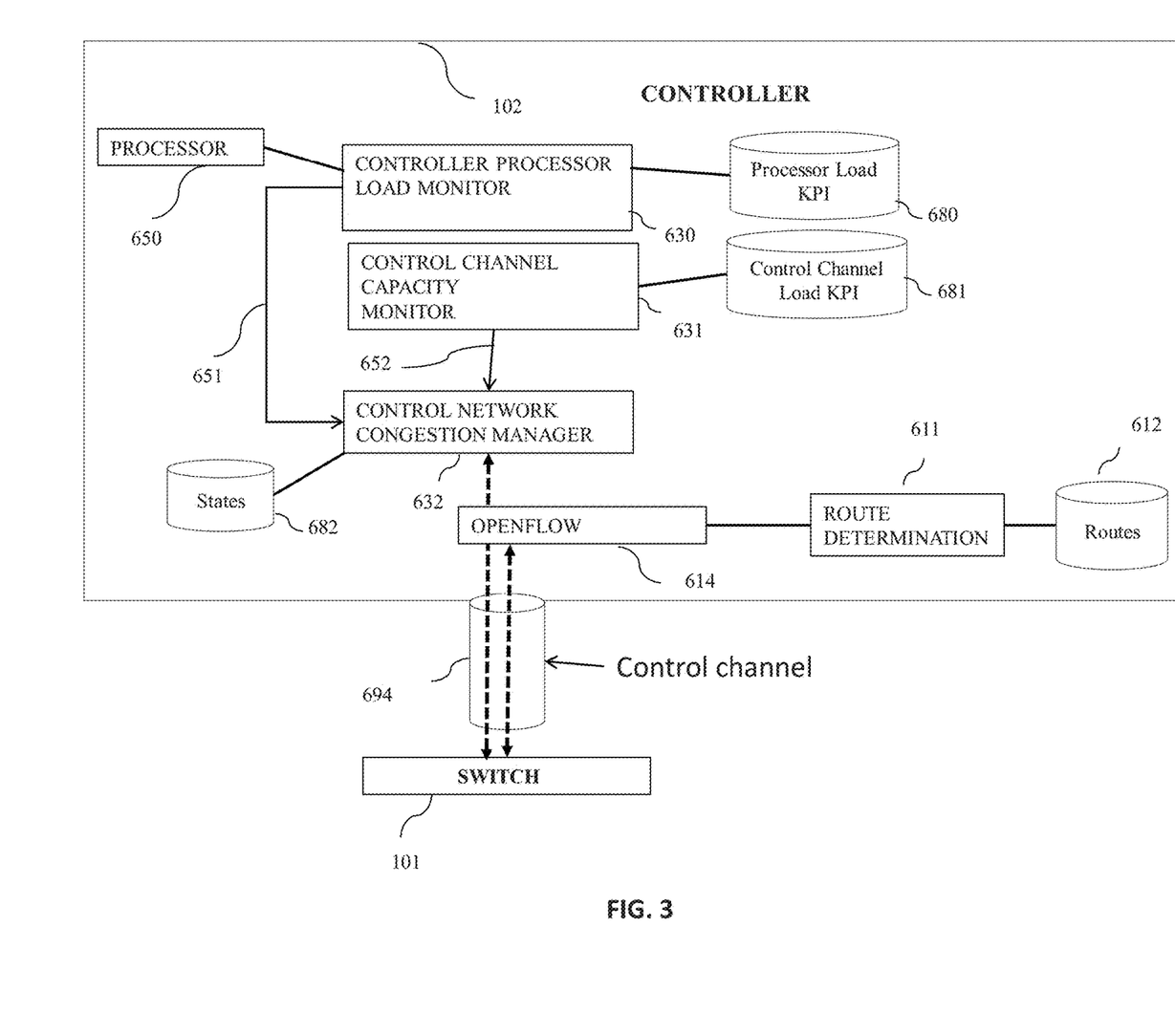
FIG. 3 illustrates the block diagram of an embodiment of the new components of an SDN controller.

A block diagram of the controller system capable of implementing the methods of this invention is illustrated in FIG. 3. The controller system has several new components to aid control network congestion handling according to an aspect of this invention. Controller 102 attaches to switch 101 with control channel 694. Although not illustrated in the figure, controller 102 is attached to each network switch with a different control channel 694. Controller processor 650 is under constant surveillance by controller processor load monitor subsystem 630 according to an aspect of this invention. The controller processor's key performance indicators (KPIs) are stored in database 680. This data can also be used to add more controllers to the SDN or increase the processing to capacity of a controller. Controller processor load monitor 630 sends a notification to control network congestion manager 632 when it detects that the processor is overloaded. Similarly, control channel capacity monitor 631 continuously monitors the utilization of all control channels 694 emanating from controller 102. If any of the control channels 694 is overloaded, it generates a notification towards control network congestion manager 632. The KPIs associated with control channel utilization are kept in database 681. If a notification is received from either controller processor load monitor or control channel capacity manager, control network congestion monitor 632 changes its state to 'congested' and stores the new state in database 682. Control network congestion manager 632 generates a request to OpenFlow 614 to send a 'congested' message towards the switch, which in turn sends the message to one (or more control) channels 694 targeting one or more network switch(es) 101. Note that if the controller is overloaded, all network switches receive a congested message while if only a channel is overloaded, the switch associated with that control channel receives a 'control-congested' message.

When switch 101 receives a 'control-congested' message on the OpenFlow control channel, it starts buffering (or dropping) unknown packets according to an aspect of this invention. When the congestion is cleared, determined by control network congestion manager 632, the state is changed in database 682 and a message is generated by OpenFlow 614 towards channel 694 indicating that the congestion condition is cleared. Control channel 694 also transmits packet-IN, flow-mod and Packet-OUT messages between controller 102 and switch 101. Note that OpenFlow 614 uses route determination 611 and routes database 612 to determine the rules/routes sent in flow-mod messages.

Figure 4:
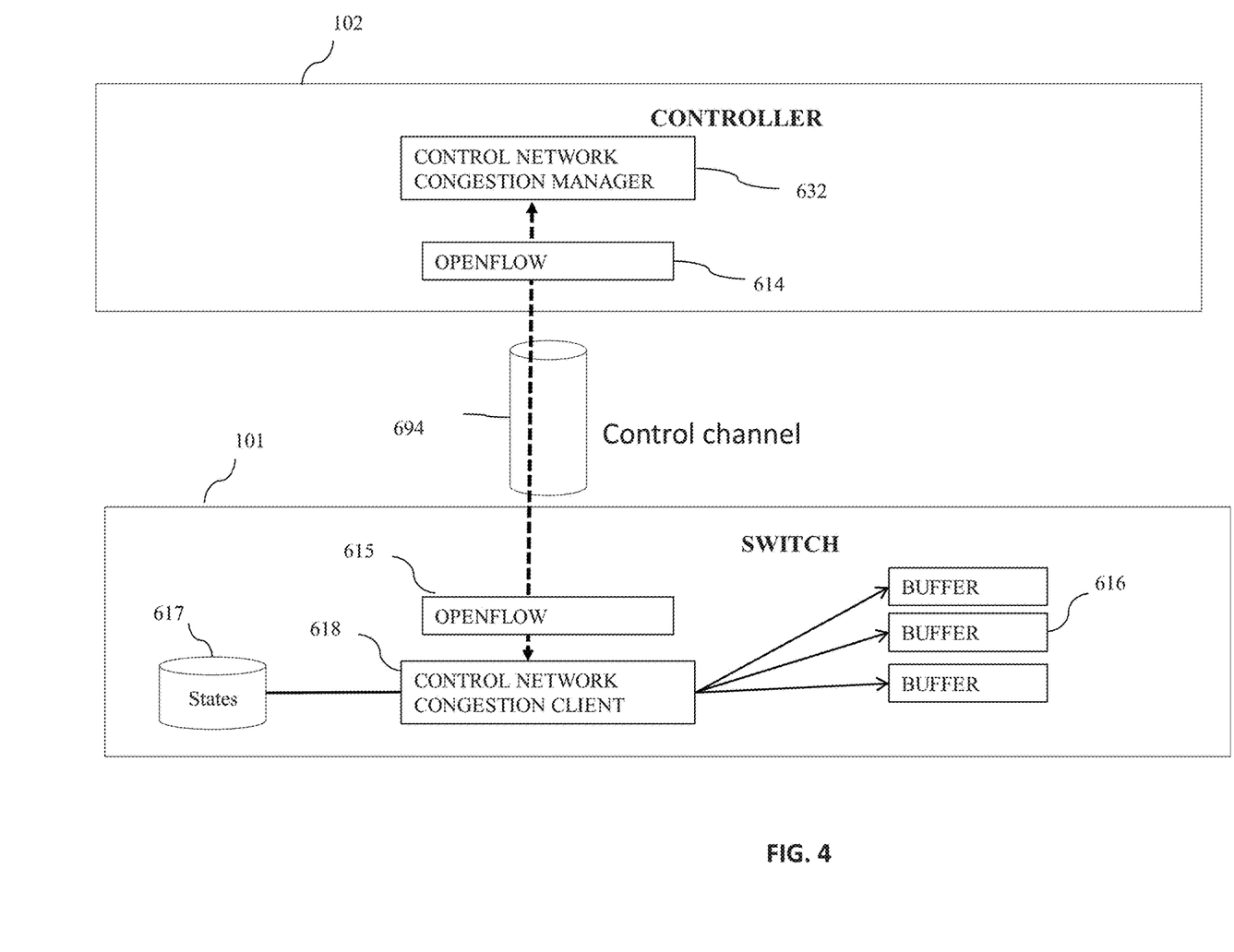
FIG. 4 illustrates the block diagram of an embodiment of the new components of a switch.

Switch 101 needs few additional features to implement the methods of this invention. As illustrated in FIG. 4 the switch intercepts the new OpenFlow 'congested/uncongested' messages at OpenFlow subsystem 615. If the switch receives a congestion indication, then it sends a message to control network congestion client 618, which in turn triggers the use of buffers 616. The state of control network congestion is kept in database 617. When the congestion is cleared by the controller the state is changed accordingly by the control network congestion client 618 and the use of buffering is stopped.

Figure 5:
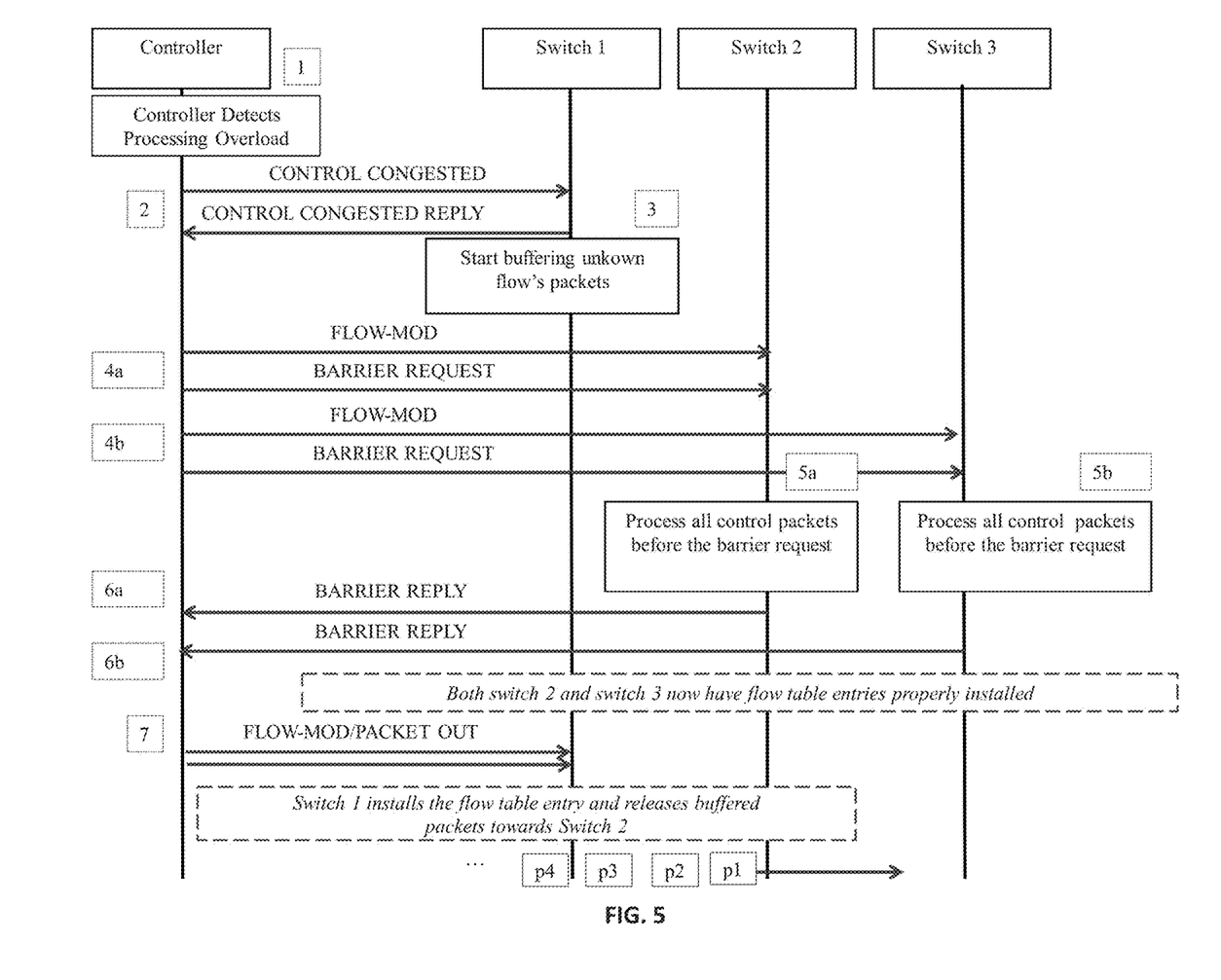
FIG. 5 depicts the steps of the method of this invention under control network congestion.

The key steps of the method of invention, when the control network is congested, are illustrated in the diagram of FIG. 5. A simple scenario with a single controller and three switches, Switch 1, 2 and 3 is envisioned. Switch 1 is the ingress switch that receives the packets of an unknown flow, whereas Switch 2 and 3 are the intermediate switches. At step-1, the controller detects the processing overload and sends a control-congested message to ingress switch, 1, which gets into a buffering mode as a result, and replies to the controller with control-congested reply at steps-2 and 3. Subsequently, controller sends flow-mod and barrier request messages to Switches 2 and 3 in steps-4a and 4b. Accordingly, Switch 2 processes all control messages including the flow-mod message in step-5a, and in parallel Switch 3 processes all control messages including the flow-mod message in step-5b. Once the process is completed, Switch 2 and 3 have the table entries for the unknown flow. Switch 2 and Switch 3 now send response the Barrier Request messages received in steps-4a and 4b with Barrier Reply messages indicating that the process is completed, in steps-6a and 6b, respectively. Finally, in step-7, the controller sends the flow-mod message and the packet-OUT message containing the received packet towards ingress switch, 1. Now, Switch 1 has a table entry as well. It releases the buffered packets towards Switch 2, which has a table entry, which in turn routes packets towards Switch 3.

Figure 6:
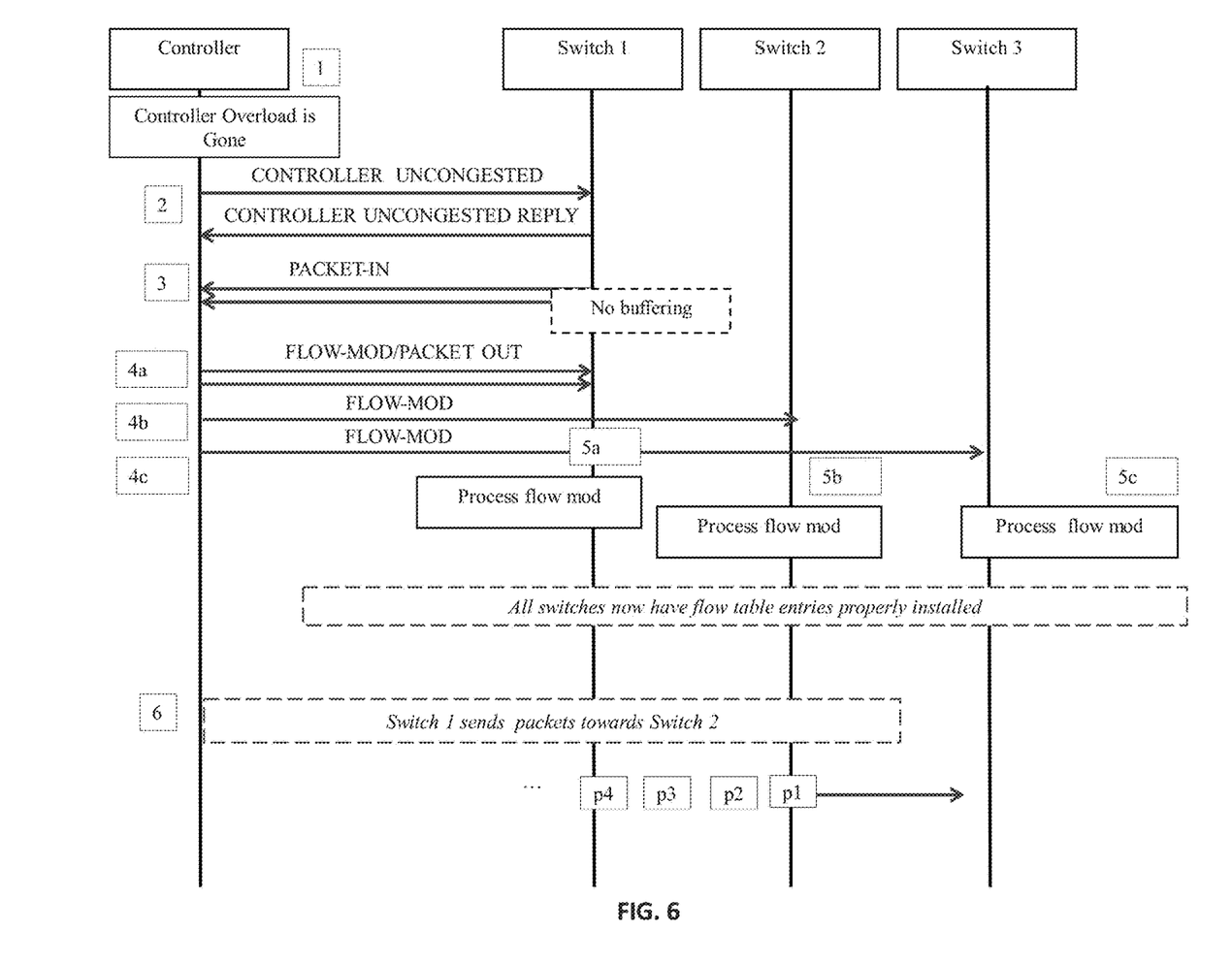
FIG. 6 depicts the steps of the method when the control network is uncongested.

The key steps of the method of invention, when the control network returns to normal after a congestion, is illustrated in the diagram of FIG. 6. A simple scenario with a single controller and three switches, Switch 1, 2 and 3 is envisioned. Switch 1 is the ingress switch that receives the packets of an unknown flow, whereas Switch 2 and 3 are intermediate switches. At step-1, the controller detects that its processing load is back to normal levels and sends a control-uncongested message to ingress switch, 1, which stops the buffering operations as a result, and replies to the controller with a control-uncongested reply at step-2. Subsequently, Switch 1 sends a packet-IN towards the controller in step-3, and in response, the controller sends flow-mod messages to Switches 2 and 3 in steps-4b and 4c, respectively, and flow-mod and packet-OUT in step-4a to Switch 1. All switches establish the table entries accordingly in steps-5a, 5b and 5c. Finally, in step-6, Switch 1 routes the packets of the flow towards Switch 2, which has a table entry, which in turn routes those received packets towards Switch 3.

Figure 7:
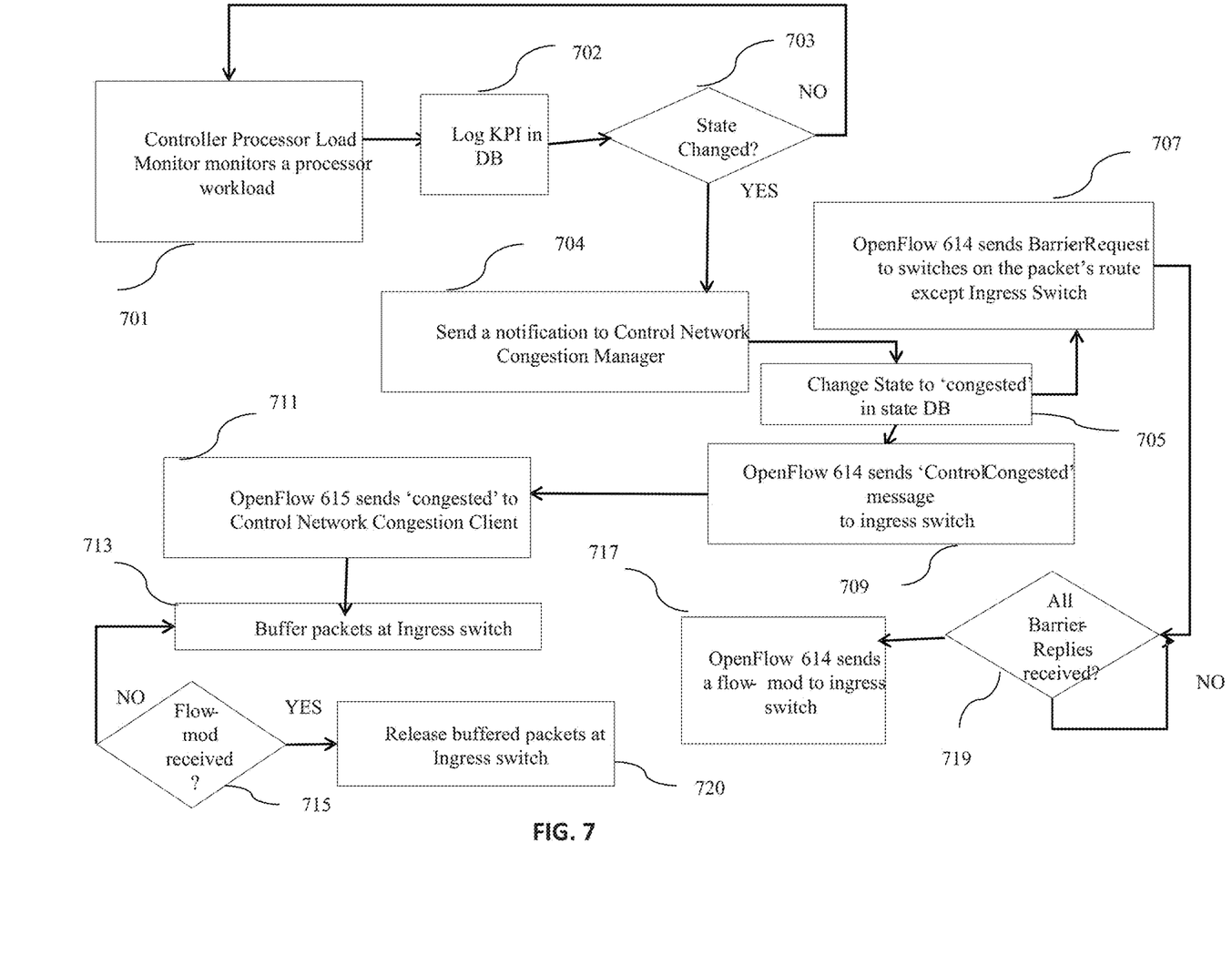
FIG. 7 depicts a simple flow chart of the method of this invention.

FIG. 7 depicts a simple flowchart showing step by step the state change from 'uncongested' to 'congested' and the subsequent operations within the controller and the switch according to an aspect of this invention. In step 701, controller processor load monitor determines that the processor is overloaded. The corresponding KPI is logged in the database in step 702. The controller processor load monitor checks to determine at step 703 if the condition is new or has been the same for a while. If the congestion is a new condition, in step 704 controller processor load monitor notifies the control network congestion manager which in turn changes the congestion state in step 705 while activating Barrier Request/Response mode in step 707 by communicating with OpenFlow 614. When OpenFlow 615 on network switch receives a 'congested' message from OpenFlow 614, it triggers the buffering operations. In step 713, the ingress switch starts buffering packets. Meanwhile, the controller starts sending Flow-Mod/Barrier Request messages to all switches except the ingress switch. In step 719, the controller checks to determine if all Barrier Reply messages are received corresponding to the Barrier Requests from all intermediate switches of the unknown flow. If YES, in step 717, the controller sends a flow-mode/packet-Out towards the ingress switch. While in 'congested' mode, the ingress switch sends only one packet-IN to the controller and starts buffering the rest of the packets of the flow, while the intermediate switches respond to Barrier-Request they receive from the controller. The ingress switch checks to determine if a flow-mod/Packet-OUT is received in step 715. If YES, the ingress switch relieves the packets from the buffer towards the next switch on the route.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for control traffic reduction between SDN controller and switch. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method as implemented in a Software Defined Network (SDN) comprising a controller and a plurality of switches, the method comprising:
   (a) receiving, at an ingress switch, an unknown packet flow comprising a plurality of packets entering the SDN, the ingress switch attached to at least one other switch, both the ingress switch and the one other switch having no flow table entry related to the unknown packet flow at the time of receiving a first packet of the unknown packet flow wherein, prior to receiving the unknown packet flow, the controller sends a message to the ingress switch, the message indicating the congested state of the control network and the message instructing the ingress switch to buffer or drop all unknown packets except the first packet, the receiving activated when a control network between the controller and plurality of switches is in a congested state;
   (b) the ingress switch sending the first packet of the unknown packet flow to the controller to request instructions for processing the unknown packet flow and buffering or dropping remainder packets of the unknown packet flow at the ingress switch;
   (c) the controller determining a route for the first packet, the determined route traversing the one other switch attached to the ingress switch as a next hop;
   (d) the controller sends a first message containing a flow table entry to the one other switch for the unknown packet flow, and a second message to request the one other switch to process all received control messages;
   (e) the one other switch replying to the controller when it completes said processing all received control messages;
   (f) the ingress switch receiving the flow table entry from the controller indicating the next hop switch being the one other switch;
   (g) the ingress switch sending the remainder packets that were buffered towards the one other switch; and
   (h) the one other switch, upon receiving the packets sent in (g), routing them towards a destination according to the received flow table entry.

2. The method of claim 1, wherein congestion of the control network occurs when a controller's processor is overloaded or when one or more control channels do not have any capacity.

3. The method of claim 1 is deactivated when the control network is no longer congested, in which case the controller immediately sends another message to ingress switch indicating that the congestion is removed, in which case the ingress switch stops buffering unknown packets and sends all packets of the unknown packet flow to the controller.

4. A system implemented in a Software Defined Network (SDN) comprising a controller and a plurality of switches, the system comprising:
   (a) a controller the controller comprising: (i) a control network monitor subsystem with controller processor and control channels monitoring capabilities, control network monitor subsystem determining whether a control network is congested; (ii) a first database storing controller processor and control channel key performance indicators collected periodically or on an event-driven basis; (iii) a control network congestion manager subsystem managing control traffic load on control channels by signaling each ingress switch associated unknown packet flows to start packet buffering when there is congestion; and (iv) a second database storing congestion states associated with control channels and controller processors;

(b) an ingress switch; and (c) one other switch, the ingress switch attached to at least one other switch;

wherein the ingress switch receiving an unknown packet flow comprising a plurality of packets entering the SDN, both the ingress switch and the one other switch having no flow table entry related to the unknown packet flow at the time of receiving a first packet of the unknown packet flow wherein, prior to receiving the unknown packet flow, the controller sends a message to the ingress switch, the message indicating the congested state of the control network and the message instructing the ingress switch to buffer or drop all unknown packets except the first packet;

the ingress switch sending the first packet of the unknown packet flow to the controller to request instructions for processing the unknown packet flow and buffering or dropping remainder packets of the unknown packet flow at the ingress switch, the controller determining a route for the first packet, the determined route traversing the one other switch attached to the ingress switch as a next hop;

wherein the controller sends a first message containing a flow table entry to the one other switch for the unknown packet flow, and a second message to request the one other switch to process all received control messages; the one other switch replying to the controller when it completes said processing all received control messages; and wherein the ingress switch receiving the flow table entry from the controller indicating the next hop switch being the one other switch; the ingress switch sending the remainder packets that were buffered towards the one other switch; and the one other switch, upon receiving the sent packets, routing them towards a destination according to the received flow table entry.

5. The system of claim 4, wherein the system is activated only when a control network is congested.

6. The system of claim 5, wherein congestion of the control network occurs when a controller's processor is overloaded or when one or more control channels do not have any capacity.

7. The system of claim 5, wherein when the control network is no longer congested, the controller immediately sending another message to ingress switch indicating congestion is removed; and upon receiving the another message on congestion removal, ingress switch stops buffering unknown packets and sends them instead to the controller.

8. An article of manufacture comprising non-transitory computer storage medium storing computer readable program code which, when executed by a computer, implements a method as implemented in a Software Defined Network (SDN) comprising a controller and a plurality of switches, the medium comprising:

(a) computer readable program code receiving, at an ingress switch, an unknown packet flow comprising a plurality of packets entering the SDN, the ingress switch attached to at least one other switch, both the ingress switch and the one other switch having no flow table entry related to the unknown packet flow at the time of receiving a first packet of the unknown packet flow wherein, prior to receiving the unknown packet flow, the controller sends a message to the ingress switch, the message indicating the congested state of the control network and the message instructing the ingress switch to buffer or drop all unknown packets except the first packet, the receiving activated when a control network between the controller and plurality of switches is in a congested state;

(b) computer readable program code sending, at the ingress switch, the first packet of the unknown packet flow to the controller to request instructions for processing the unknown packet flow and buffering or dropping remainder packets of the unknown packet flow at the ingress switch;

(c) computer readable program code at the controller determining a route for the first packet, the determined route traversing the one other switch attached to the ingress switch as a next hop;

(d) computer readable program code at the controller sending a first message containing a flow table entry to the one other switch for the unknown packet flow, and a second message to request the one other switch to process all received control messages;

(e) computer readable program code at the one other switch replying to the controller when it completes said processing all received control messages;

(f) computer readable program code at the ingress switch receiving the flow table entry from the controller indicating the next hop switch being the one other switch;

(g) computer readable program code at the ingress switch sending the remainder packets that were buffered towards the one other switch; and (h) computer readable program code at the one other switch, upon receiving the packets sent in (g), routing them towards a destination according to the received flow table entry.

9. The article of manufacture of claim 8, wherein congestion of the control network occurs when a controller's processor is overloaded or when one or more control channels do not have any capacity.

10. The article of manufacture of claim 8, wherein the method is deactivated when the control network is no longer congested, in which case computer readable code at the controller immediately sends another message to ingress switch indicating that the congestion is removed, in which case the ingress switch stops buffering unknown packets and sends all packets of the unknown packet flow to the controller.

* * * * *